United States Patent
Uemura et al.

(10) Patent No.: US 7,802,907 B2
(45) Date of Patent: Sep. 28, 2010

(54) VEHICLE

(75) Inventors: Kiyotaka Uemura, Shizuoka (JP); Yoshiharu Matsumoto, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 636 days.

(21) Appl. No.: 11/221,534

(22) Filed: Sep. 8, 2005

(65) Prior Publication Data
US 2006/0056191 A1    Mar. 16, 2006

(30) Foreign Application Priority Data
Sep. 10, 2004    (JP) .............................. 2004-263152

(51) Int. Cl.
*B62J 6/00* (2006.01)
(52) U.S. Cl. .................. 362/476; 362/473; 362/474; 362/475; 362/538; 362/540; 180/219; 180/220; 296/77.1; 296/78.1
(58) Field of Classification Search ......... 362/473–476, 362/498, 538, 540; 180/219, 200; 296/77.1, 296/78.1
See application file for complete search history.

(56) References Cited

U.S. PATENT DOCUMENTS

| | | | |
|---|---|---|---|
| 2,168,939 A * | 8/1939 | Kraeft ........................ 74/551.8 |
| 6,158,543 A * | 12/2000 | Matsuto et al. ............. 180/220 |
| 6,276,482 B1 * | 8/2001 | Moriya et al. ............... 180/229 |
| 2001/0013708 A1 * | 8/2001 | Tanaka et al. .............. 296/37.1 |
| 2004/0145903 A1 * | 7/2004 | Arakawa .................... 362/494 |
| 2004/0227628 A1 * | 11/2004 | Burdick ...................... 340/479 |
| 2006/0000652 A1 * | 1/2006 | Yamaguchi et al. ........ 180/68.3 |
| 2006/0021814 A1 * | 2/2006 | Hasegawa et al. .......... 180/219 |
| 2006/0023462 A1 * | 2/2006 | Uemoto et al. ............. 362/475 |

FOREIGN PATENT DOCUMENTS

| | | |
|---|---|---|
| EP | 1 361 144 A2 | 11/2003 |
| JP | 05254472 A * | 10/1993 |
| JP | 09-242630 | 9/1997 |
| JP | 2003-320978 A | 11/2003 |

* cited by examiner

*Primary Examiner*—Sandra L O'Shea
*Assistant Examiner*—Mary Zettl
(74) *Attorney, Agent, or Firm*—Keating & Bennett, LLP

(57) ABSTRACT

A vehicle that is able to improve visibility of the light member (turning indicator) mounted to the front side of the motorcycle body, is preferably an underbone type motorcycle, and includes an engine, a head pipe disposed above the front of the engine, a main frame extending downward in the rear direction from the head pipe and disposed above the engine. In addition, the vehicle includes handlebars disposed above the head pipe, a cover member for covering the handlebars, a headlight disposed at the front sides of the cover member, a cover member for covering the front side of the head pipe, and width indicators and turn signals disposed at the front side of the cover member.

10 Claims, 8 Drawing Sheets

VEHICLE

BACKGROUND OF THE INVENTION

1. Field of the Invention

The present invention relates to a motorcycle body, and especially to an underbone type motorcycle including a frame extending from the head pipe downward in the rear direction.

2. Description of the Related Art

Conventionally, a rider can more easily straddle an underbone type motorcycle because, even though a larger wheel is used compared with those of scooter type motorcycles for stable running on an unpaved road, the motorcycle body frame behind the head pipe is arranged to extend downward in the rear direction, so that the height of the frame between the seat and the steering handlebars is made smaller (see Patent Document JP-A-Hei 9-242630, for example).

In Patent Document JP-A-Hei 9-242630, an underbone type motorcycle is disclosed to have a headlight and a pair of turn signals (turning indicators) positioned at two outer locations of the headlight and mounted to the cover members for covering the handlebars.

An improvement in the visibility of turn signals (turning indicators) is needed in the underbone type motorcycle disclosed in the above Patent Document in which a cover member has a headlight and a pair of turn signals attached thereto.

SUMMARY OF THE INVENTION

In order to overcome the problems described above, preferred embodiments of the present invention provide a vehicle which is able to improve visibility of the light member (turning indicator) mounted to the front side of the motorcycle body.

According to a preferred embodiment of the present invention, a vehicle includes an engine, a head pipe disposed above a front of the engine, a frame disposed above the engine, handlebars disposed above the head pipe, a first cover member for covering the handlebars, a first light member mounted to the front side of the first cover member, a second cover member arranged to cover the front side of the head pipe, and a second light member mounted to the second cover member.

As for the vehicle according to the preferred embodiment described above, the first light member is mounted to the front side of the first cover member so as to cover the handlebars and the second light member is mounted to the front side of the second cover member so as to cover the front side of the head pipe. Thereby, the distance between the first light member and the second light member can be made longer than the case that both the first light member and the second light member are mounted to the first cover member so as to cover the handlebars. Therefore, because the distance between the headlight and the turning indicators can be made longer in the case that the first light member includes the headlight and the second light member includes the turning indicators, visibility of the turning indicators can be improved.

Other features, elements, characteristics, and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention will be described hereinafter with reference to the drawings.

Figure 1:
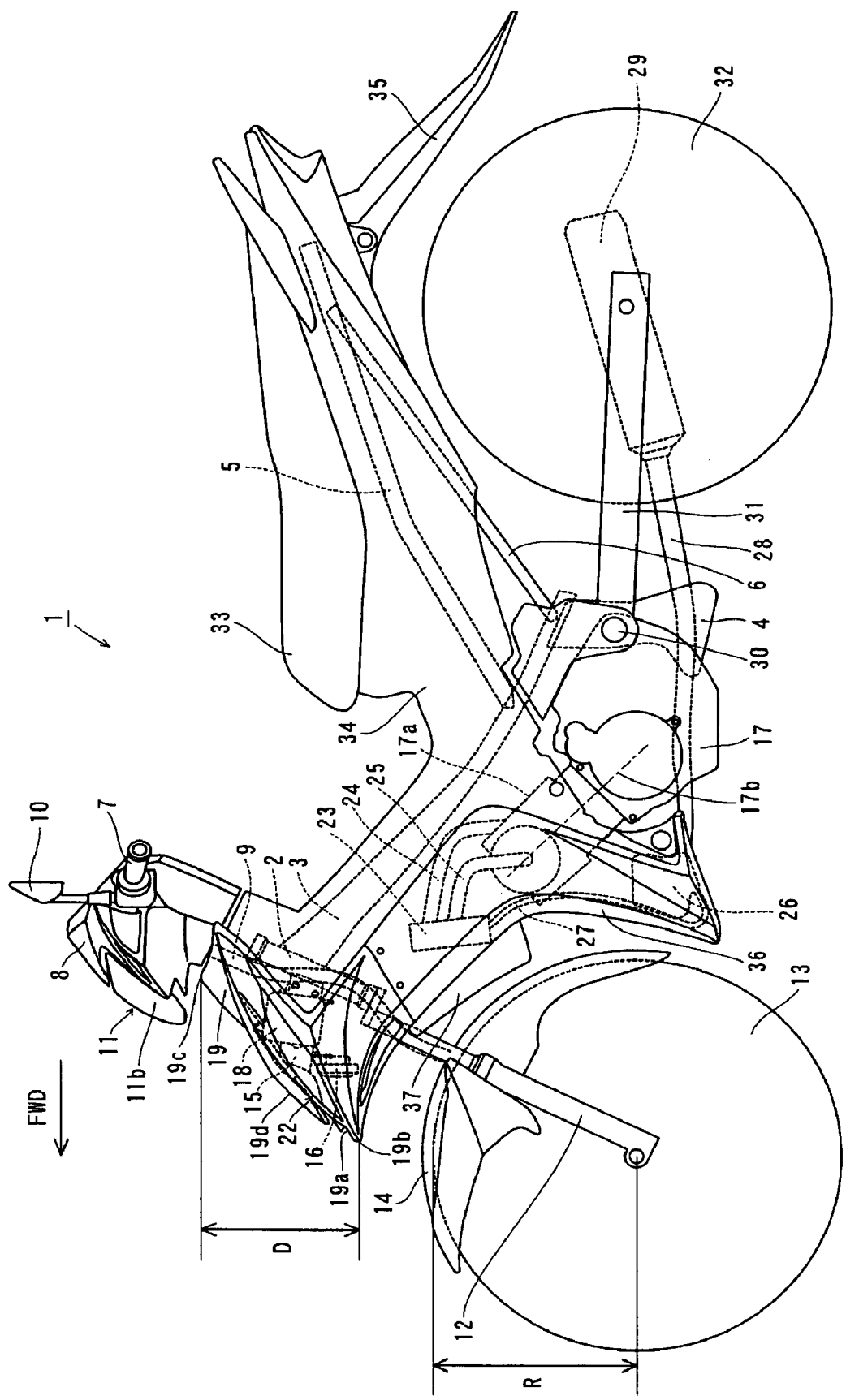
FIG. 1 is a side view, showing the entire structure of a motorcycle according to a preferred embodiment of the present invention.
Figure 2:
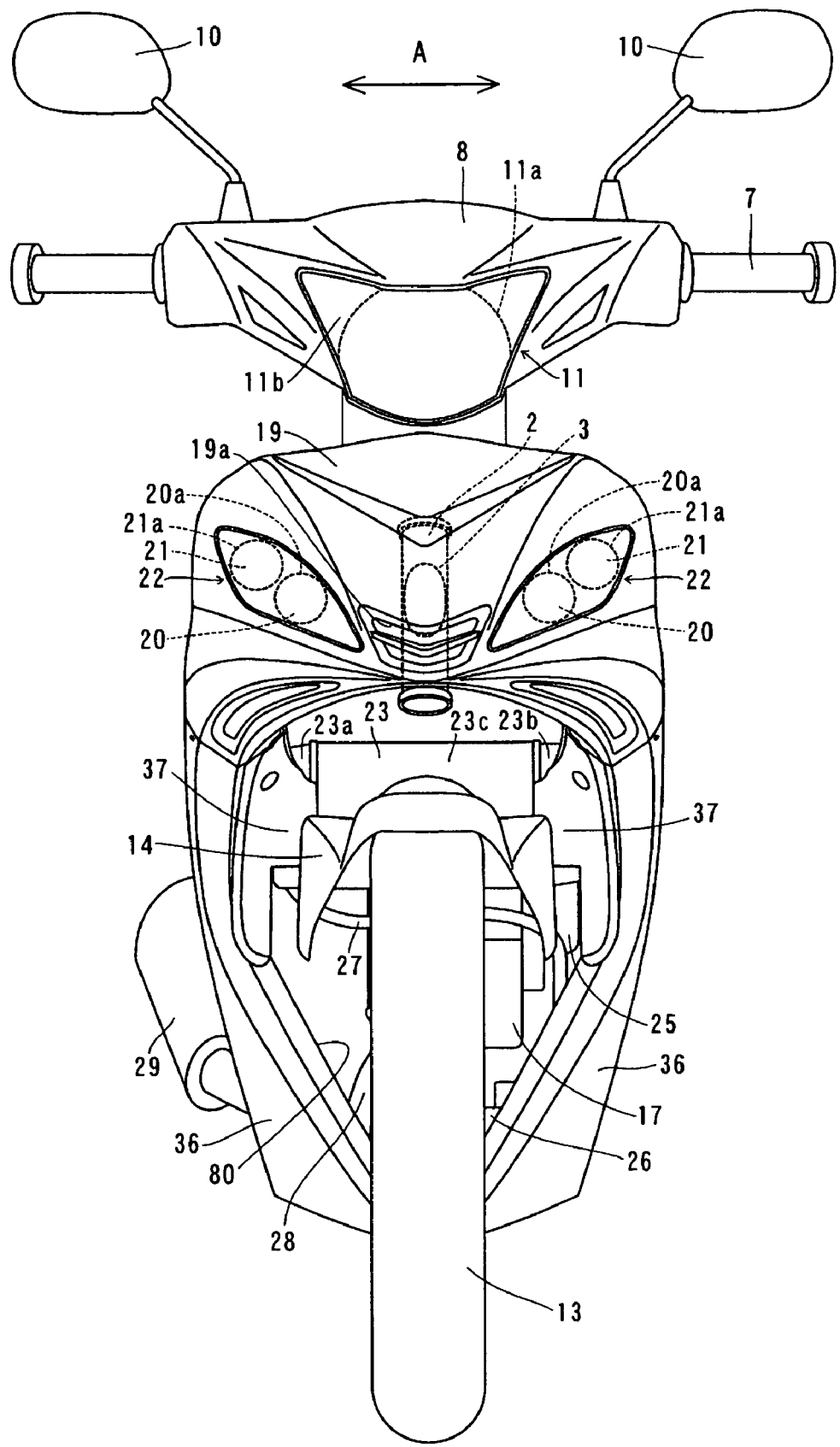
FIG. 2 is a front view of the motorcycle according to the preferred embodiment shown in FIG. 1.

FIG. 1 is a side view, showing the entire structure of a motorcycle according to a preferred embodiment of the present invention. FIG. 2 is a front view of the motorcycle according to a preferred embodiment shown in FIG. 1. FIGS. 3 through 7 are figures for illustrating the detailed structure of the motorcycle according to the preferred embodiment shown in FIG. 1. The arrow FWD in the drawings indicates the forward direction of the motorcycle. Further, according to the present preferred embodiment, as an example of a vehicle of the present invention, an explanation will be made with respect to an underbone type motorcycle, in which the height of the frame between the seat and the steering handlebars is reduced even though larger wheels compared with those of scooter type motorcycles are used for stable running on an unpaved road. The structure of a motorcycle according to the preferred embodiment of the present invention will be explained hereinafter in detail with reference to FIGS. 1 through 8.

The underbone type motorcycle 1 according to a preferred embodiment of the present invention, as shown in FIG. 1, has a head pipe 2 and a main frame 3 connecting its front end to the head pipe 2. This main frame 3 is an example of a "frame", in the present invention. The main frame 3 is formed to extend in the downward direction to the rear side. A rear arm bracket 4 is connected to the rear end of the main frame 3. A seat rail 5 extending upward of the rear side is connected to the main frame 3. A backstay 6 is connected between the rear end of the main frame 3 and the rear portion of the seat rail 5. The body frame includes the head pipe 2, main frame 3, rear arm bracket 4, seat rail 5, and backstay 6.

Figure 4:
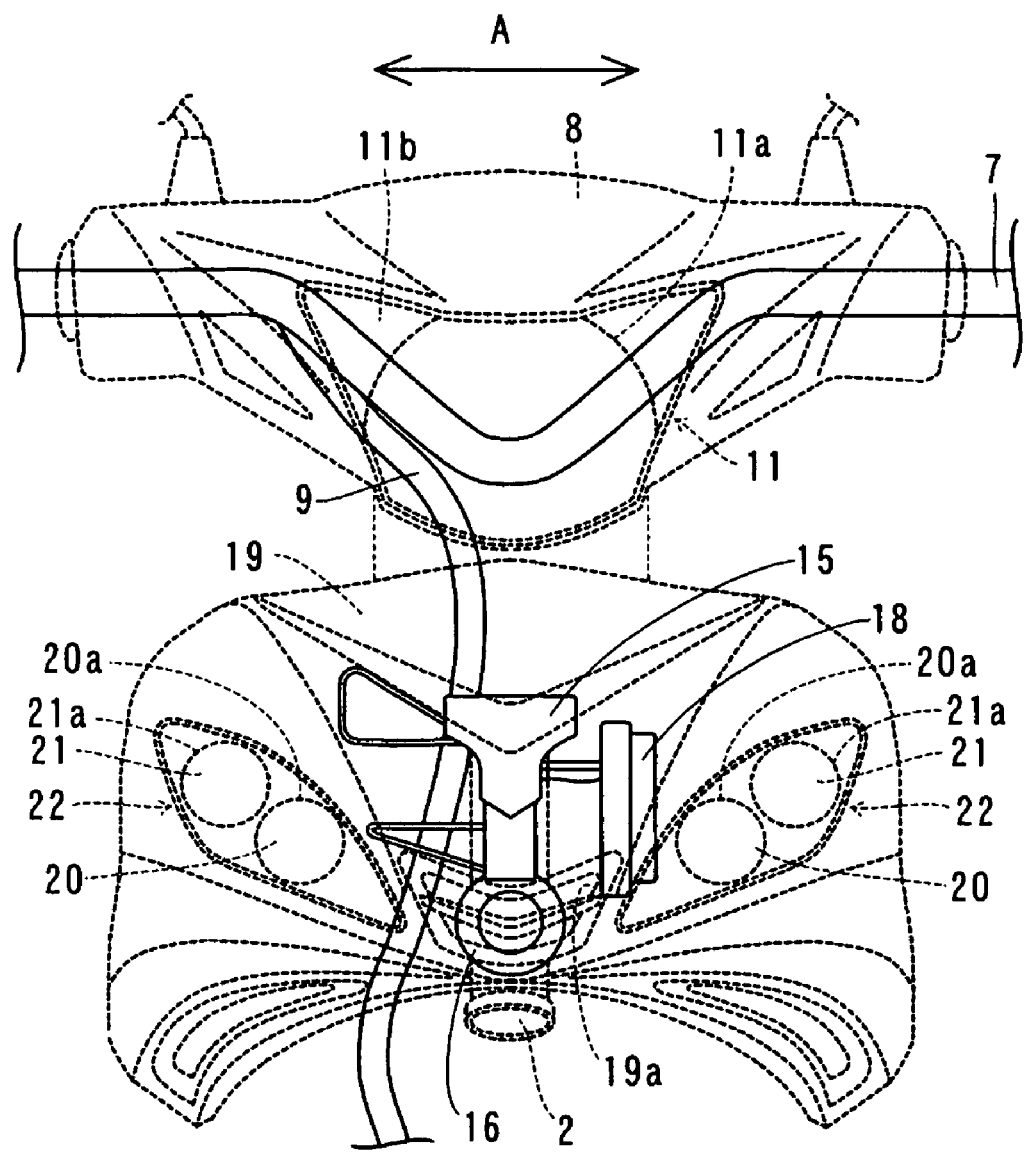
FIG. 4 is a front view for describing the inner components around the cover member of the motorcycle according to the preferred embodiment shown in FIG. 1.

Steering handlebars 7 and a cover member 8 for covering the handlebars 7 are rotatably disposed above the head pipe 2. A cover member 8 is an example of the "first cover member" in the present preferred embodiment. As shown in FIG. 4, a brake hose 9 is mounted to the left portion of the steering handlebars 7, as viewed from the front of the motorcycle body. This brake hose 9 is arranged to extend downward along the head pipe 2. The cover member 8 is formed to rotate together with the turning motion of the steering handlebars 7 about the head pipe 2. A pair of rearview mirrors 10 is, as shown in FIG. 2, mounted on the cover member 8 in a width direction of the motorcycle body (direction A) at a predetermined distance from each other.

In the present preferred embodiment, a headlight 11 including a bulb 11a as a light source and a lens part 11b is mounted to the center portion, in the width direction of the motorcycle body, of the front side of the cover member 8. The headlight 11 is an example of the "first light member" in the preferred embodiment. Further, because the headlight 11 mounted to the cover member 8 rotates together with the steering handlebars 7 about the head pipe 2, the headlight 11 always illuminates the running direction of the motorcycle body (the direction to which the front wheel 13 described below is directed).

As shown in FIG. 1, a pair of front forks 12 is mounted to the lower end of the head pipe 2. A front wheel 13 with a diameter larger than that of a scooter type motorcycle is rotatably mounted to the lower end of this pair of front forks 12. Above the front wheel 13, a front fender 14 is disposed to cover the front wheel 13 from above.

Figure 5:
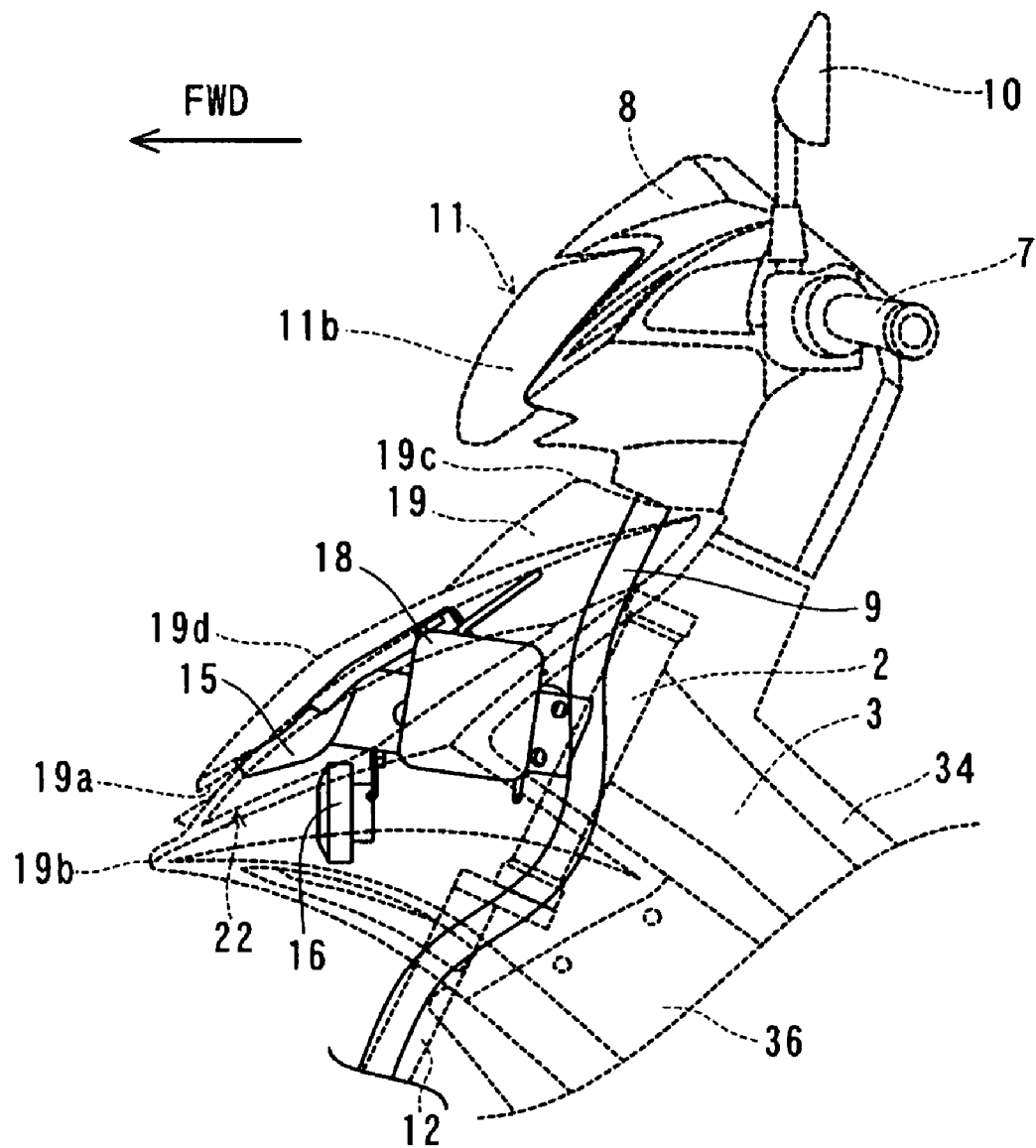
FIG. 5 is a side view for describing the inner components around the cover member of the motorcycle according to the preferred embodiment shown in FIG. 1.
Figure 6:
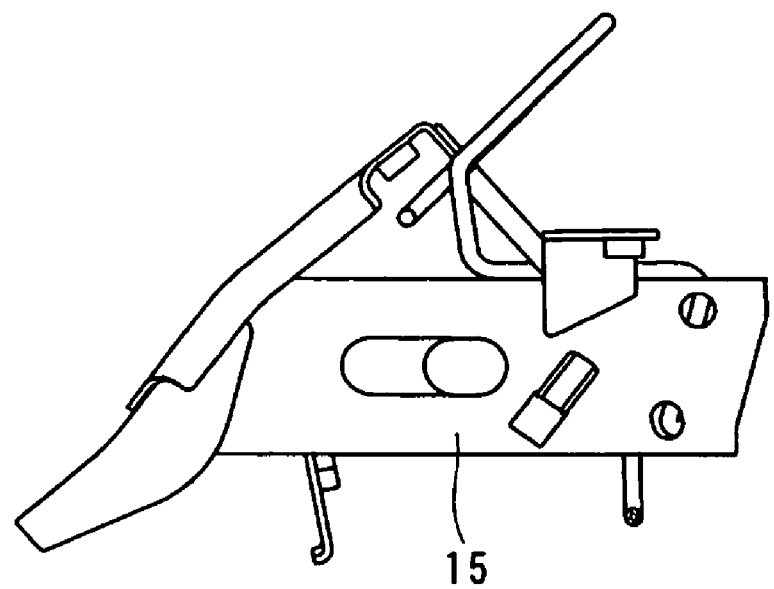
FIG. 6 is a side view for describing the detailed structure of a bracket of the motorcycle according to the preferred embodiment shown in FIG. 1.
Figure 7:
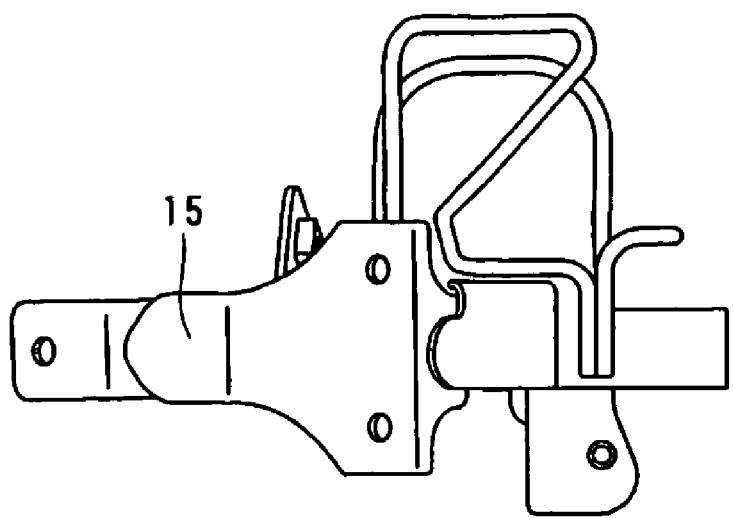
FIG. 7 is a plan view for describing the detailed structure of a bracket of the motorcycle according to the preferred embodiment shown in FIG. 1.
Figure 8:
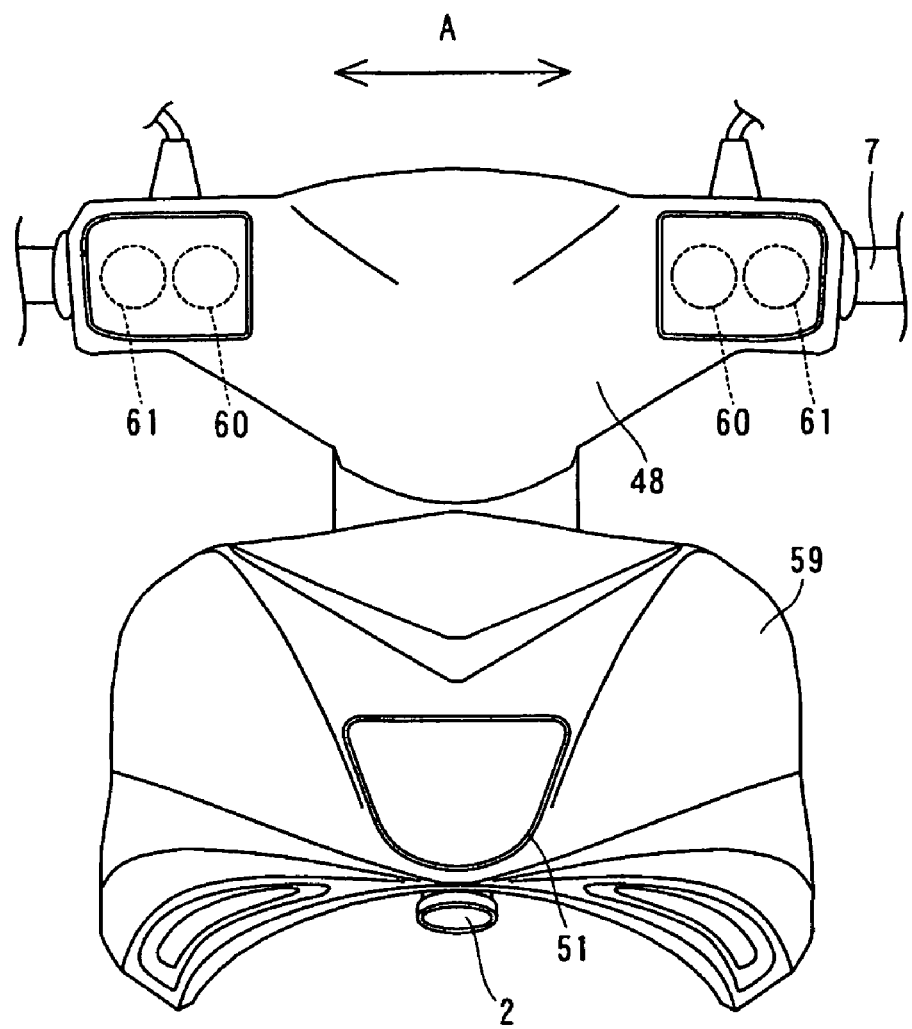
FIG. 8 is a front view for describing a cover member and a light member according to a variation of a preferred embodiment of the present invention.

In the present preferred embodiment, the rear portion of a bracket 15 is mounted to the front side of the head pipe 2 as shown in FIG. 5. This bracket 15 has a profile as shown in FIG. 6, and a top shape as described in FIG. 7. A horn 16 for sounding an alarm is mounted to the lower portion of the bracket 15. As shown in FIG. 4, a CDI (Capacitor Discharge Ignition) unit 18 for igniting the fuel inside the engine 17, described below (see FIG. 1), is mounted to the right portion of the bracket 15, as viewed from the front. As shown in FIG. 5, a cover member 19 for covering the front portion of the head pipe 2 and bracket 15 is provided in front of the head pipe 2 and the bracket 15. The cover member 19 is an example of the "second cover member" in the present preferred embodiment. An opening 19a for releasing the alarm sound of the horn 16 is provided on the portion of the cover member 19 positioned forward of the horn 16.

Figure 3:
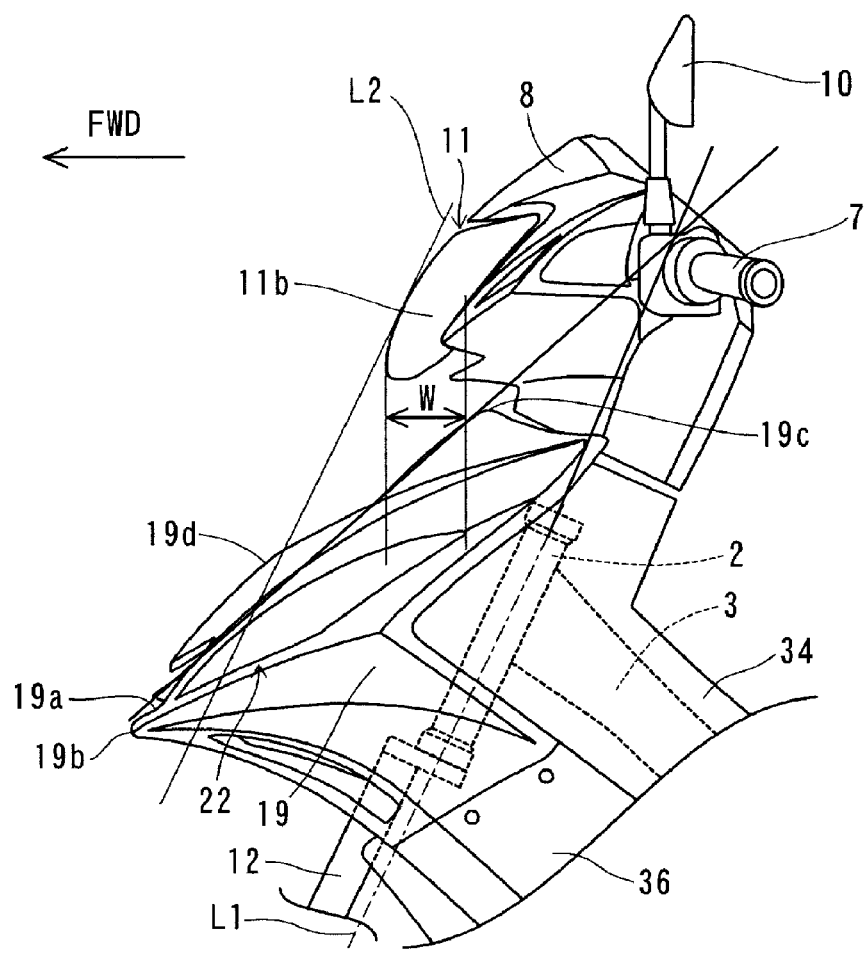
FIG. 3 is a side view, showing a cover member and its surroundings of the motorcycle according to the preferred embodiment shown in FIG. 1.

In the present preferred embodiment, as shown in FIG. 3, the front edge 19b of the cover member 19 for covering the front side of the head pipe 2 is, as viewed from the side of the motorcycle body, parallel or substantially parallel to the center axis line L1 of the head pipe 2 and is disposed in front of the line L2 tangent to the front side of the cover member 8. As shown in FIG. 1, the vertical distance D between the front end portion 19b of the cover member 19 and the upper end portion 19c of the cover member 19 is smaller than the radius R of the front wheel 13. The front side portion 19d of the cover member 19 is, as shown in FIG. 3, formed into a convex shape to project upward of the front side.

In the present preferred embodiment, as shown in FIG. 2, a pair of width indicators 20 disposed at a predetermined distance in the width direction of the motorcycle body (direction A) and a pair of turn signals 21 are disposed on the front side of the cover member 19. The width indicators 20 and the turn signals 21 are an example of the "second light member" in the present preferred embodiment. The pair of width indicators 20 includes bulbs 20a as a light source, and the pair of turn signals 21 includes bulbs 21a as a light source. The pair of width indicators 20 and the pair of turn signals 21 include common lens parts 22. The pair of width indicators 20 and the pair of turn signals 21 are mounted to illuminate the area forward of the motorcycle body when the handlebars 7 are rotated. Therefore, when the handlebars 7 are rotated about head pipe 2 as a center, the headlight 11 and the pair of width indicators 20 and the turn signals 21 respectively illuminate different directions; the running direction of the motorcycle body (the direction to which the wheel 13 is directed), and the forward direction of the motorcycle body, so as to illuminate a wide range. Therefore, visibility is improved. The pair of turn signals 21 is disposed at the upper and outer sides, in the width direction of the motorcycle body (direction A), of the pair of width indicators 20. As shown in FIG. 3, a portion of the common lens part 22 of the width indicators 20 and the turn signals 21 is, as viewed from the side of the motorcycle body, disposed to extend to the vicinity of the front end portion 19b of the cover member 19. The common lens part 22 of the width indicators 20 and the turn signals 21 is disposed so that the position in the longitudinal direction of the motorcycle body, as viewed from the side of the motorcycle body, overlaps the lens part 11b of the headlight 11 only with the length of W in FIG. 3. A space is formed inside the cover member 19 between the pair of the width indicators 20 and between the pair of turn signals 21. Some components such as the bracket 15, horn 16, CDI unit 18, and brake hose 9 are disposed in this space of cover member 19, as shown in FIG. 4.

As shown in FIGS. 1 and 2, an engine 17 is disposed beneath the main frame 3. This engine 17 is, as shown in FIG. 1, disposed so that the cylinder axis 17b of the cylinder 17a extends obliquely upward in the forward direction. A radiator 23 for cooling the engine 17 is disposed above and in front of the engine 17, and beneath the main frame 3. As shown in FIG. 2, this radiator 23 includes a pair of tanks 23a and 23b disposed at a predetermined distance in the width direction (direction: A) of the motorcycle body 1, and a core portion 23c disposed between the pair of tanks 23a and 23b. A plurality of apertures (not shown) where headwind passes are provided on the core portion 23c. The radiator 23 is, as shown in FIG. 1, connected to the engine 17 by a feed pipe 24 and a return pipe 25 for circulating the cooling water. A reserve tank (recovery tank) 26 having a function of maintaining the cooling water at a fixed amount is disposed beneath the front side of the engine 17. The reserve tank 26 is connected to the radiator 23 by a feed/discharge pipe 27. An exhaust pipe 28 is fixed to the lower portion of the engine 17. As shown in FIG. 2, the exhaust pipe 28, as viewed from the front of the motorcycle body, curves leftward and extends to the rear, and is connected to the muffler 29.

The rear arm bracket 4 connected to the main frame 3 is, as shown in FIG. 1, provided with a pivot shaft 30. The pivot shaft 30 allows the front end of the rear arm 31 to be pivotably supported so as to allow the rear end of the rear arm 31 to swing up/down. A rear wheel 32 is rotatably attached to the rear end of the rear arm 31. A seat 33 is disposed above the seat rail 5. A body cover 34 is mounted, extending from the front to the rear of the vehicle body so that it can cover the head pipe 2 and the seat rail 5. The body cover 34 has a rear fender 35 mounted at its rear side in the running direction (in the direction of an arrow FWD). The rear fender 35 is designed to cover the rear wheel 32 from above. The vehicle body cover 34 is, as shown in FIGS. 1 and 2, provided with a pair of leg shields 36 in the front side in the running direction (in the direction of the arrow FWD in FIG. 1) for covering the front side of the rider's legs at a predetermined distance in the width direction of the motorcycle body (the direction A in FIG. 2) and having an opening 80 on its front side. The pair of leg shields 36 is provided with a pair of wind baffle walls 37 preferably made of resin, or other suitable material, for guiding headwind to the radiator 23. The front side of this wind baffle wall 37 is disposed to project from the front side of the leg shields 36.

The headlight 11 is mounted to the front side of the cover member 8 for covering the handlebars 7, and the pair of turn signals 21 is mounted to the front side of the cover member 19 for covering the front side of the head pipe 2. As a result, the distance between the headlight 11 and the pair of the turn signals 21 can be made longer than the case that both the headlight 11 and the pair of the turn signals 21 are mounted to the cover member 8 for covering the handlebars 7. Thus the visibility of the turn signals 21 can be improved.

Further, according to the present preferred embodiment, the headlight 11 is disposed at the center portion in the width direction (direction A in FIG. 2) of the motorcycle body, and the pair of the width indicators 20 and the pair of turn signals 21 are disposed at a predetermined distance in the width direction (direction A in FIG. 2) of the motorcycle body. As a result, the distance between the headlight 11 disposed at the center in the width direction of the motorcycle body and the pair of width indicators 20 and the pair of turn signals 21 can be made longer. Thus the visibility of the pair of the width indicators 20 and the pair of turn signals 21 can be improved.

According to the present preferred embodiment, in which the pair of width indicators 20 is provided separately from the headlight 11, the illumination from the motorcycle body is significantly increased. In addition, because the amount of light of the illumination from the width indicators 20 is less than that of the headlight 11, reduction in visibility of the turn signals 21 can be restricted when the width indicators 20 are located in the vicinity of the turn signals 21.

According to the present preferred embodiment, the front end portion 19b of the cover member 19 is, as viewed from the side of the motorcycle body, disposed parallel to the center axis line L1 of the head pipe 2, and forward of the line L2 tangent to the front side of the cover member 8 (the front side of the lens part 11b of the headlight 11). A portion of the common lens part 22 of the width indicators 20 and the turn signals 21 is disposed so that it, as viewed from the side of the motorcycle body, extends to the vicinity of the front end portion 19b of the cover member 19. Thereby, the distance between the lens part 11b of the headlight 11 and the lens part 22 of the turn signals 21 can easily be made longer. Thus the visibility of the turn signals 21 can be easily improved.

According to the present preferred embodiment, the lens part 11b of the headlight 11 is disposed so that the position in a longitudinal direction of the motorcycle body, as viewed from the side of the motorcycle body, overlaps the position of the common lens part 22 of the width indicators 20 and the turn signals 21 only with the length of W in FIG. 3. As a result, the common lens part 22 of the width indicators 20 and the turn signals 21 can be disposed to extend to the lateral side of the cover member 19. Thus, the distance between the headlight 11 disposed at the center in the width direction of the motorcycle body (the direction A in FIG. 2) and the turn signals 21 can be made longer. It is therefore possible to improve visibility of the turn signals 21. In this case, because its position in the longitudinal direction of the motorcycle body, as viewed from the side of the motorcycle body, overlaps the position of the common lens part 22 of the width indicators 20 and turn signals 21 in the longitudinal direction of the motorcycle body only with the length W in FIG. 3, the distance between the headlight 11 and the turn signals 21 becomes short, as viewed from the side of the motorcycle body. However, because the amount of the light of the illumination of the headlight 11 toward the sides is small, a reduction of visibility from the sides of the motorcycle body of the turn signals 21 can be restricted. The lens part 11b of the headlight 11 is disposed so that, as viewed from the side of the motorcycle body, its position in the longitudinal direction of the motorcycle body overlaps the position in the longitudinal direction of the motorcycle body of the common lens part 22 of the width indicators 20 and the turn signals 21 only with the length W in FIG. 3. Thereby, the lens part 22 can be disposed to extend toward the side of the cover member 19. Thus, the distance between the pair of width indicators 20 and also the distance between the pair of turn signals 21 can be made longer. Therefore, visibility of the pair of width indicators 20 and the pair of turn signals 21 can be improved.

According to the present preferred embodiment, the pair of lens parts 22 common to the width indicators 20 and the turn signals 21 on the cover member 19 are disposed at a predetermined distance in a width direction of the motorcycle body (the direction A in FIG. 2), whereby a space can be provided in the interior between the pair of lens parts 22. In addition, the front side of the cover member 19 is formed into a convex shape projecting upward of its front side, whereby the space inside the cover member 19 can be made larger without the extension of the cover member 19 downward. Thus, the space inside the cover member 19 can be made larger without a reduction of the radius of the front wheel 13. It is therefore possible, without a reduction of the radius of the front wheel 13, to dispose the components such as the bracket 15, horn 16, CDI unit 18 and brake hose 9 in the interior space between the pair of width indicators 20 and the pair of turn signals 21 of the cover member 19.

According to the present preferred embodiment, because the vertical distance D between the front end portion 19b of the cover member 19 for covering the front side of the head pipe 2 and the upper end portion 19c of the cover member 19 is reduced, the radius of the front wheel 13 can be made larger than the case that the distance D of the cover member 19 is made longer than the radius R of the front wheel 13. In this case, the pair of turn signals 21 is mounted to the cover member 19 for covering the front side of the head pipe 2 while using a front wheel with a large radius. As a result, the distance between the pair of turn signals 21 and the headlight 11 mounted to the cover member 8 for covering the handlebars 7 can be made longer. Therefore, while the front wheel 13 with a large radius is used, visibility of the turn signals 21 can be improved.

It should be conceivable that the preferred embodiments are disclosed herein simply for the purpose of showing an example in all respects, rather than limitations. The scope of the present invention is not defined by the description of the preferred embodiments, but defined by the scope of the claims, and includes the meanings equivalent to those of the scope of the claims as well as any modifications that fall within the scope of the claims.

For instance, in the preferred embodiment described above, an underbone type motorcycle in which the height of a main frame is small was described as an example of the vehicle. However, the present invention is not limited to this preferred embodiment, and may also be applied to a vehicle other than a motorcycle, such as a three-wheeled motor vehicle, as long as it is an underbone type vehicle in which the main frame is arranged to extend downward in the rear direction.

In the preferred embodiment described above, an example is described such that the headlight 11 is disposed at the center, in the width direction of the motorcycle body, at the front side of the cover member 8, and the pair of width indicators 20 and the pair of turn signals 21 were disposed on the front side of the cover member 19 at a predetermined distance in the width direction of the motorcycle body. However, the present invention is not limited to this preferred embodiment. As shown with a variation of the present preferred embodiment in FIG. 8, a pair of width indicators 60 and a pair of turn signals 61 may be disposed on the front side of the cover member 48 for covering the handlebars 7 in the width direction (direction A) of the motorcycle body at a predetermined distance, and a headlight 51 is disposed on the front side of the cover member 59 for covering the front side of the head pipe 2.

In the preferred embodiment described above and the variations of the present preferred embodiment, an example is described such that the headlight is disposed at the center portion in the width direction of the motorcycle body. However, the present invention is not limited to this arrangement, and a plurality of headlights may be disposed in the width direction of the motorcycle body at a predetermined distance.

In the preferred embodiment described above, an example is described such that the headlight is disposed at the front side of the cover member 8 for covering the handlebars, and the turn signals and width indicators are disposed at the front side of the cover member 19 for covering the front side of the head pipe. However, the present invention is not limited to this preferred embodiment, and the headlight and a pair of width indicators may be disposed at the front side of the cover member 8, and a pair of turn signals may be disposed at the front of the cover member 19 for covering the front side of the head pipe.

In the preferred embodiment described above, the example is described such that a pair of lens parts common to the pair of the width indicators and a pair of turn signals are applied. However, the present invention is not limited to this preferred embodiment, and a pair of lens parts corresponding to the pair of width indicators and a pair of lens parts corresponding to the pair of turn signals may be arranged separately.

While the present invention has been described in detail, the foregoing description is in all aspects illustrative and not restrictive. It is understood that numerous other modifications and variations can be devised without departing from the scope of the invention.

What is claimed is:

1. A vehicle comprising:
   an engine;
   a head pipe arranged above a front of the engine;
   a frame extending from the head pipe downward in a rear direction and arranged above the engine;
   handlebars arranged above the head pipe;
   a first cover member arranged to cover the handlebars;
   a first light member mounted to a front side of the first cover member;
   a second cover member, separate and spaced from the first cover member, arranged to cover a front side of the head pipe;
   a second light member mounted to the front side of the second cover member; and
   a front fork arranged beneath the head pipe, a front wheel arranged beneath the front fork, and a front fender attached to the front wheel and spaced away from and below the second cover member, wherein a height between a front-most lower end portion of the second cover member and an upper-most front end portion of the second cover member is smaller than a radius of the front wheel, and a height between a bottom of the second cover and a top of the front fender is larger than a height between a top of the front wheel and the top of the front fender; wherein
   in a lateral side view of the vehicle, a line passing through the front-most lower end portion and the upper-most front end portion of the second cover member intersects a line extending through an axis of the head pipe at a location in a vicinity of the handlebars.

2. The vehicle according to claim 1, wherein at least one of the first light member and the second light member includes a pair of light members arranged at a predetermined distance in a width direction of the vehicle.

3. The vehicle according to claim 2, wherein either the first light member or the second light member includes a headlight, and the other one of the first light member and the second light member includes a pair of turning indicators arranged at a predetermined distance in a width direction of the vehicle.

4. The vehicle according to claim 2, wherein the second light member includes the pair of light members, and the second light members are arranged on the second cover member such that components of the vehicle are arranged in a space between the pair of the second light members.

5. The vehicle according to claim 1, wherein either the first light member or the second light member includes a headlight, and the other one of the first light member and the second light member includes a pair of turning indicators arranged at a predetermined distance in a width direction of the vehicle.

6. The vehicle according to claim 5, wherein the first light member includes the headlight arranged at a center portion, in the width direction of the vehicle, of the front side of the first cover member, and the second light member includes the pair of turning indicators on the second cover member arranged at a predetermined distance in the width direction of the vehicle.

7. The vehicle according to claim 6, wherein the second light member includes the pair of turning indicators and a pair of width indicators on the second cover member arranged at a predetermined distance in the width direction of the vehicle, and the pair of turning indicators is arranged outside of the pair of width indicators in the width direction of the vehicle.

8. The vehicle according to claim 1, wherein a front end portion of the second cover member is, as viewed from the side of the vehicle, substantially parallel to a center axis line of the head pipe, and arranged in front of a line tangent to the front side of the first cover member, and the second light member is, as viewed from the side of the vehicle, mounted to the front side of the second cover member.

9. The vehicle according to claim 1, wherein a position of at least a portion of the first light member is arranged such that the first light member in a longitudinal direction of the vehicle, as viewed from the side of the vehicle, overlaps a position of the second light member in the longitudinal direction of the vehicle.

10. The vehicle according to claim 1, wherein the front side of the second cover member has a convex shape projecting upward in a front direction of the vehicle.

* * * * *